J. A. TAFT.
METHOD OF FORMING COTTON AND THE LIKE INTO BALES.
APPLICATION FILED SEPT. 7, 1909. RENEWED JAN. 7, 1915.

1,145,630.

Patented July 6, 1915.
7 SHEETS—SHEET 1.

Witnesses
B. G. Bramm
George E. Edelen

Inventor
John A. Taft
H. H. Bliss
Attorney

J. A. TAFT.
METHOD OF FORMING COTTON AND THE LIKE INTO BALES.
APPLICATION FILED SEPT. 7, 1909. RENEWED JAN. 7, 1915.

1,145,630.
Patented July 6, 1915.
7 SHEETS—SHEET 5.

J. A. TAFT.
METHOD OF FORMING COTTON AND THE LIKE INTO BALES.
APPLICATION FILED SEPT. 7, 1909. RENEWED JAN. 7, 1915.

1,145,630.

Patented July 6, 1915.
7 SHEETS—SHEET 7.

Witnesses

Inventor
John A. Taft.
H. H. Bliss
Attorney

UNITED STATES PATENT OFFICE.

JOHN A. TAFT, OF COLUMBUS, OHIO.

METHOD OF FORMING COTTON AND THE LIKE INTO BALES.

1,145,630. Specification of Letters Patent. Patented July 6, 1915.

Application filed September 7, 1909, Serial No. 516,334. Renewed January 7, 1915. Serial No. 1,049.

*To all whom it may concern:*

Be it known that I, JOHN A. TAFT, a citizen of the United States, residing at Columbus, in the county of Franklin and State of Ohio, have invented certain new and useful Improvements in Methods of Forming Cotton and the like into Bales, of which the following is a specification, reference being had therein to the accompanying drawing.

This invention relates to an improved method of treating and manipulating cotton and analogous material in forming bales or packages thereof. The improvements are particularly applicable when it is desired to produce round or substantially cylindrical bales of these materials.

The frame-work which supports the operative parts may be constructed in any suitable way. As shown, it comprises the vertical plates or side uprights A, A', with a bottom base section $A^2$, and in addition to these there may be such cross-bars or girts that are found necessary. Each of the side parts A, A' is, at one end, extended upward and longitudinally outward to provide the bars $a$, $a'$ with a passage or guide-way between them at $a^2$.

B is the prime shaft of the machine, being mounted transversely of the frame-work in the bearings at $b$. To this shaft is secured the drive wheel B', which receives power from any driving mechanism, through a belt. To the shaft B there is also secured an initial gear wheel C.

D indicates a second shaft parallel to that of B, and preferably directly above it and approximately in the same vertical plane. To this shaft there is secured a roll E, capable of engaging with the cotton at the surface of the bale, and rotating the latter. It and its shaft are driven by the wheel C, there being a spur-gear I, secured to the shaft D, meshing with the drive pinion C.

On the prime shaft B there is a roll F loosely mounted and adapted to rotate independently thereof when contacting with a rotating bale. In the frame at transverse lines near the other end there are mounted an upper series of shafts $g$ and $h$, and a lower series $g'$ and $h'$. On these shafts, respectively, there are secured rolls G, H, G', H'. This series of rolls is driven from the shaft D through a gear wheel J on said shaft, a gear wheel J' meshing therewith and secured to the shaft $h$ of the first roll, and a train of gear wheels K, K', L, L', respectively, secured to the rolls on that side of the machine opposite to the side where are situated the wheels J and J'.

For reasons which will be more fully set forth below, the power devices in the train last above referred to are so constructed and related that the peripheral speed of the rolls H, H' is somewhat less than the peripheral speed of the bale-driving roll E, one ratio that I have found advantageous being 12 to 13½.

It will be seen that the rolls G, G', H, H', are so situated that the uppermost longitudinal lines of the lower rolls G', H' are considerably above the lowermost longitudinal lines of the upper rolls G, H; that is to say, the rolls overlap vertically, this resulting in having a web or sheet which, while passing through these rolls, envelops a large part of the surface of each.

The machine is adapted to have a bale core employed in connection therewith, such a core being indicated at N. At the commencement of any bale-forming operation this core is situated parallel to and near the plane which includes the axes of the rolls E and F. And the core is so held at first that its periphery is related properly to the peripheries of the rolls to permit a web or sheet to commence enveloping the core. The core yields away from the last said plane as the bale enlarges in diameter. Its outward movement is resisted in the construction shown by means of a hydraulic apparatus indicated as a whole by O. It comprises a cylinder $o$, a piston P, and a piston rod $p$. which may be of any of the usual sorts or of any preferred character. To the piston rod there is secured a rack-bar Q which engages with a spur-wheel R secured to a shaft S, this shaft being preferably mounted near the center, vertically of the machine and at one end thereof. To the shaft S there are secured grooved wheels or drums T, and to these are fastened the ends of cables or ropes U. The latter extend first upward to guide-sheaves or pulleys V, which are supported on a shaft W, mounted transversely of the frame. From the sheaves V the cables or ropes U extend to the end parts of the bale core N. They may be connected directly to the core by means of loops formed on the end of the cable; but preferably an intermediate connecting device is employed between each cable and one of the ends of the core.

Y indicates such connecting device. It is composed of a shank part $y$ having an eye $y'$ for receiving the end of the cable, and at the other end having a loop at $y^2$ for attachment to the core. As shown, this loop comprises a half ring $y^3$ carried by the shank $y$ and a movable half ring $y^4$ hinged to the lower part $y^3$. At $y^5$ there is an adjustable fastener in the form of an eye-bolt hinged to the lower part $y^3$ and adapted to detachably engage with the upper part $y^4$, the latter having an open ended slot to receive it.

It will be seen that if the piston P is resisted from moving forward in the cylinder $o$, it will correspondingly retard the shaft S in its rotation, and this, in turn, will, through the cables U, resist the movement of the core N outward from the rolls E and F. And it will be further seen that by means of the clamping devices at $y^2$, the free rotation of the core N can be resisted to any extent desired. This retarding of the core, or resisting its rotation, can be accomplished in other ways, as, for instance, by merely inserting its ends into loops in the ends of the cables U.

Figure 1:
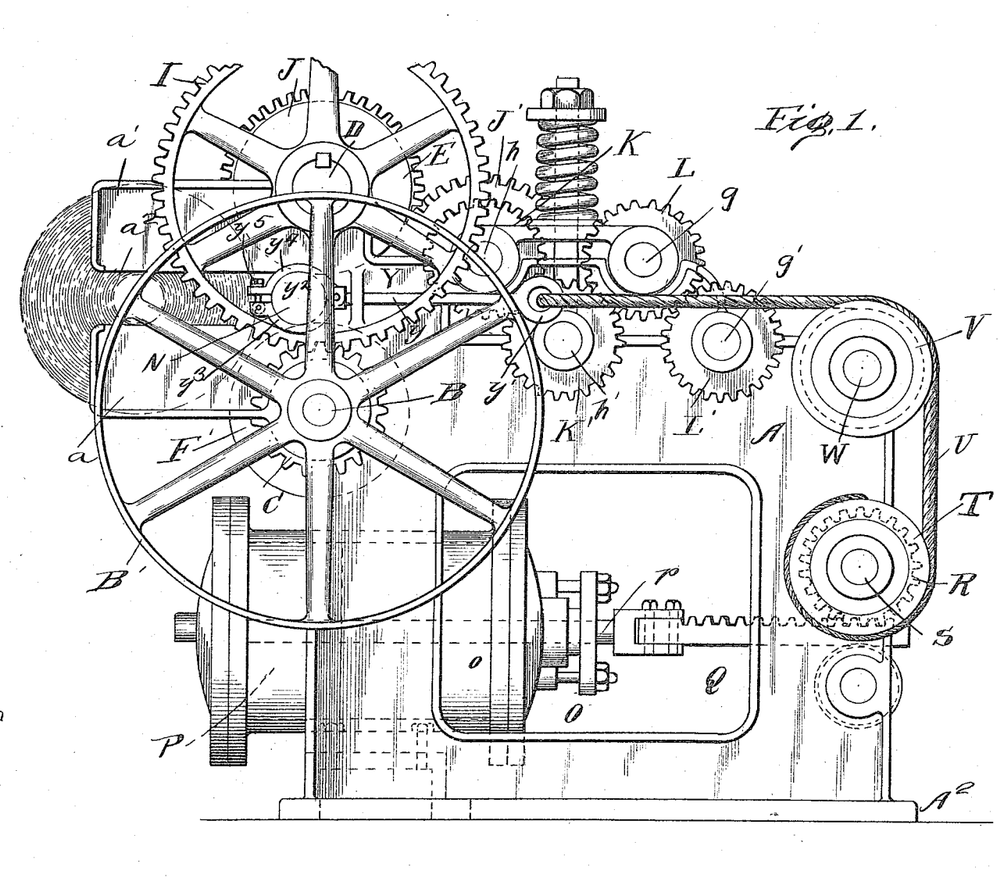
Figure 1 is a side view of a mechanism embodying the improvements by which my method can be practised.
Figure 2:
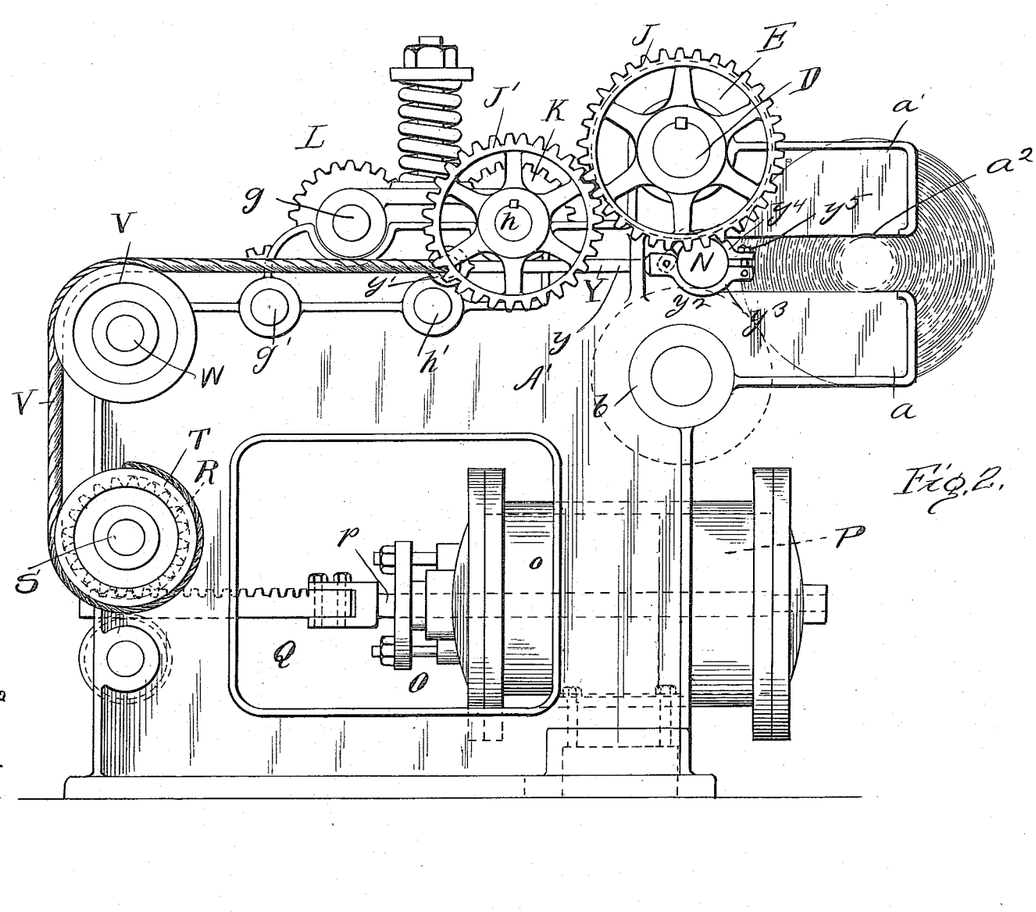
Fig. 2 is a side elevation from the opposite side.
Figure 3:
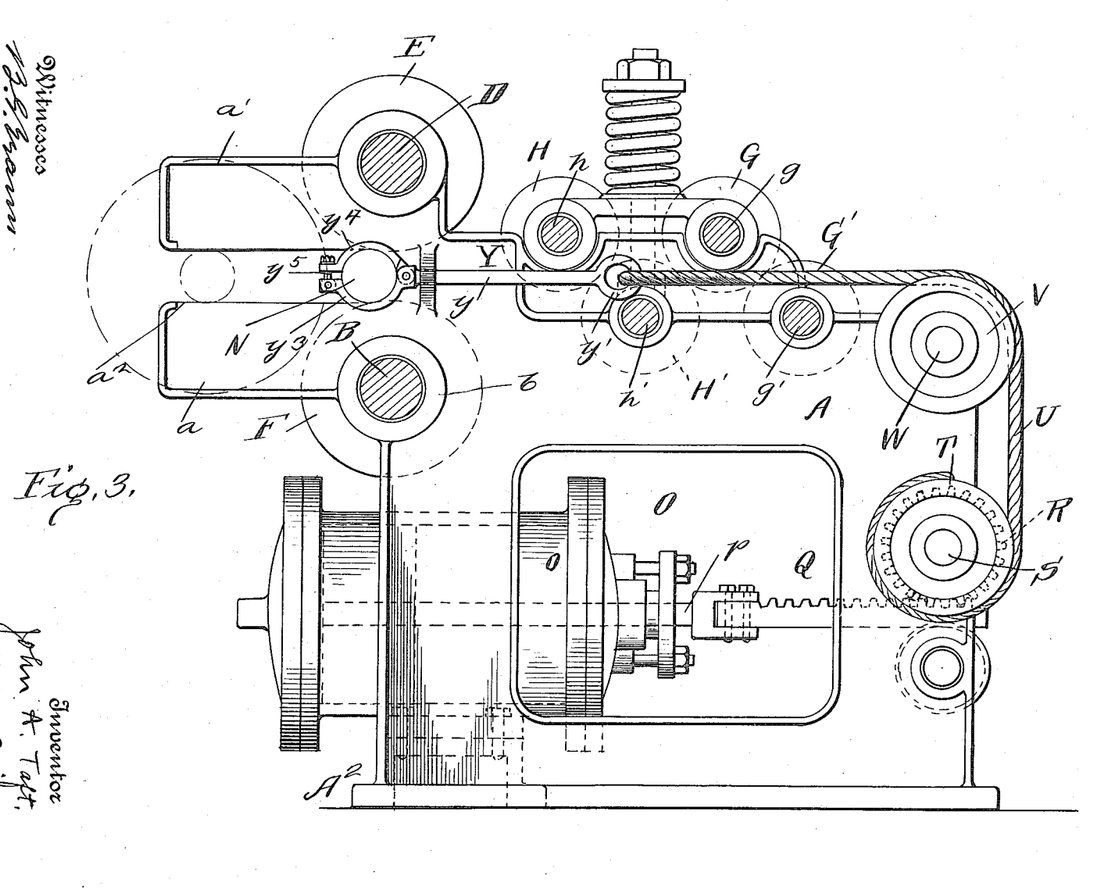
Fig. 3 is a side elevation showing all the parts of the machine except the gearing.
Figure 4:
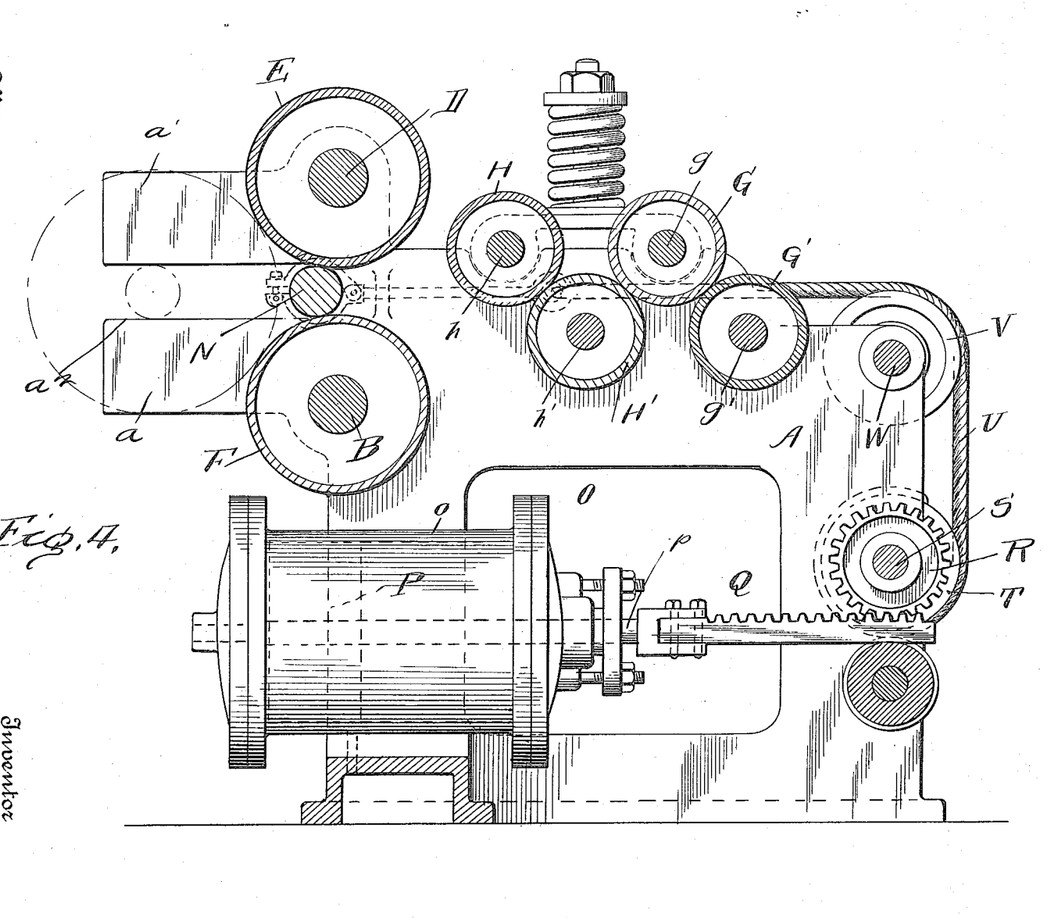
Fig. 4 is a central vertical longitudinal section.
Figure 5:
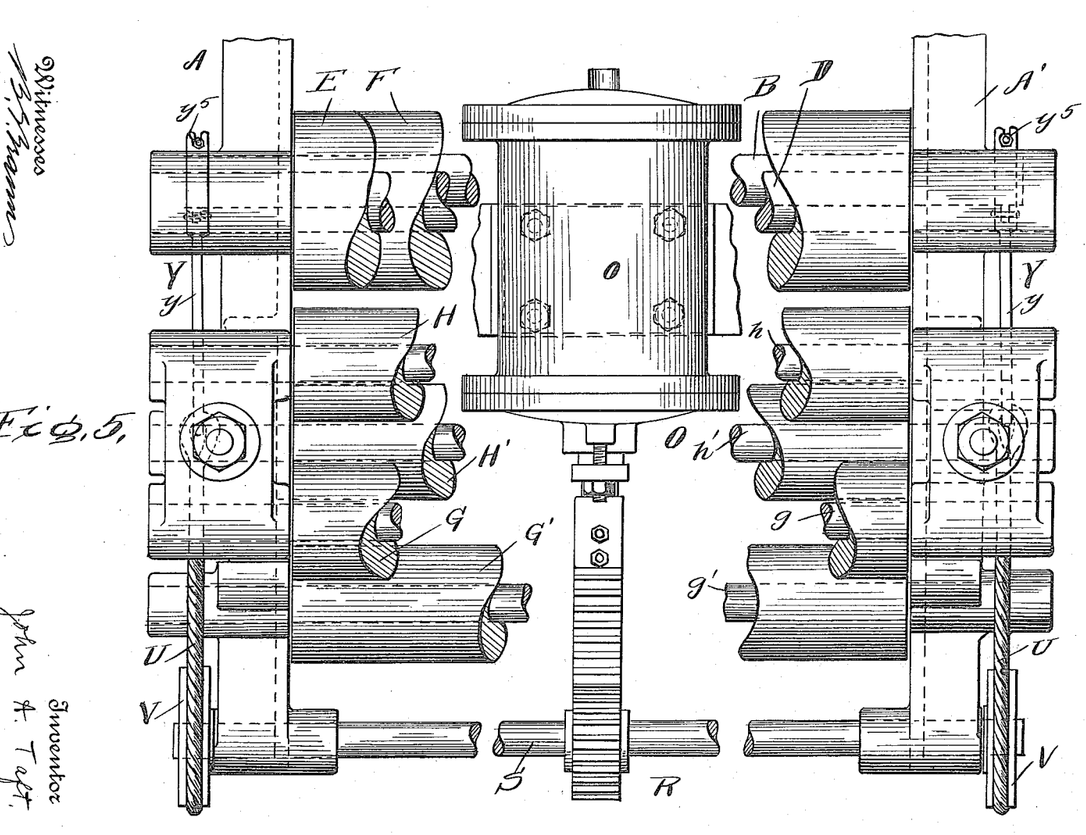
Fig. 5 is a top plan view showing some of the parts broken off.
Figure 6:
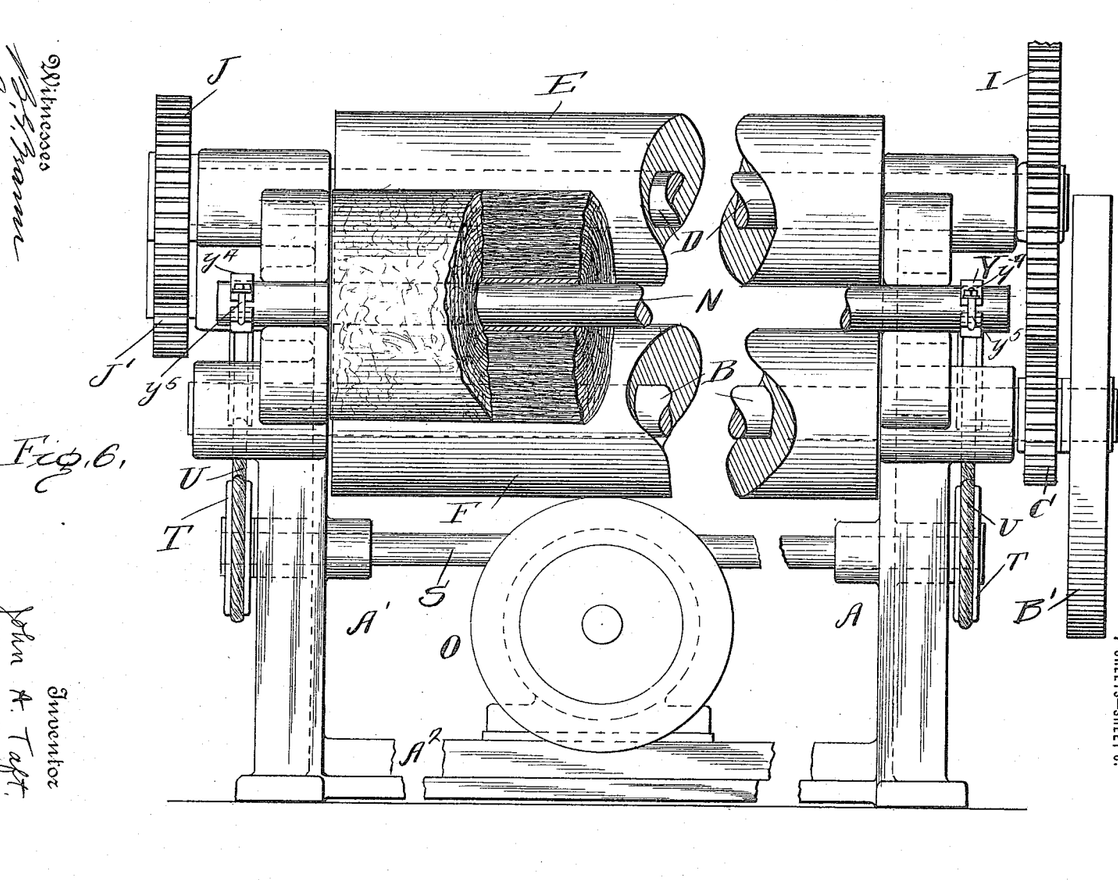
Fig. 6 is an end elevation looking at the machine from the bale-delivering end.
Figure 7:
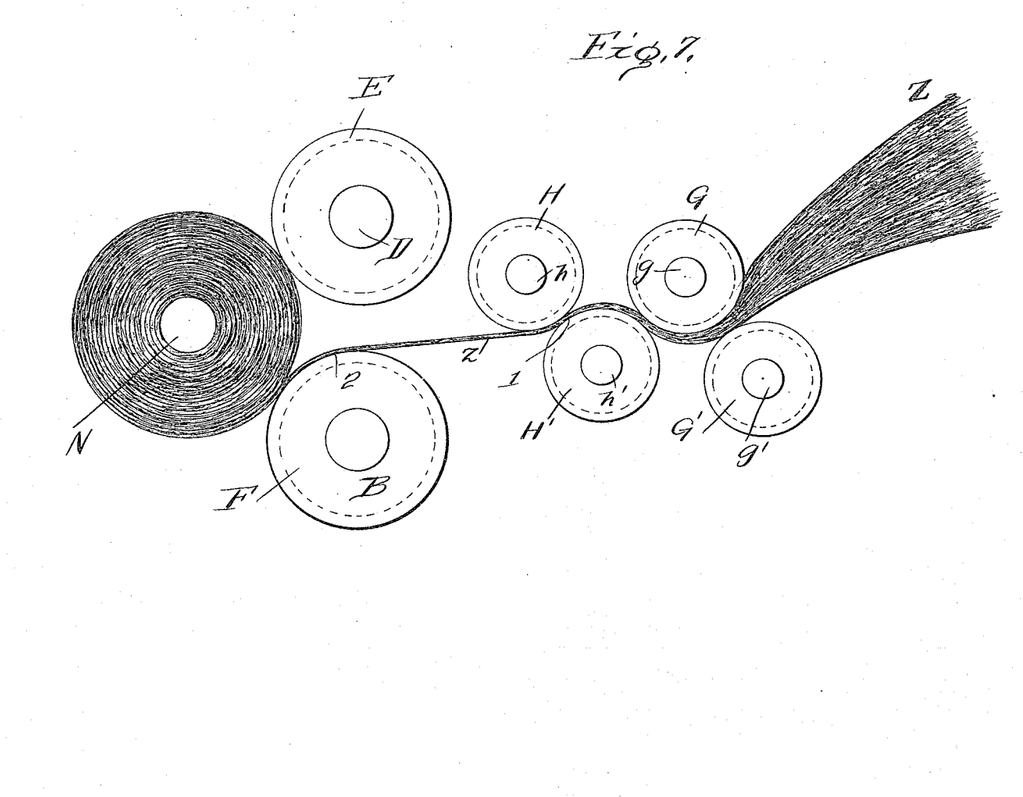
Fig. 7 is a diagrammatic view showing the action of the compressing and winding rolls.

When the machine is in operation the cotton is supplied to it as a loose bat, as illustrated in diagram, Fig. 7. I make a comparatively thick bat Z, initially, so as to have a large mass of cotton fibers which can be compressed tightly to a thin sheet, such as shown at $z$. I do this in order to provide a sheet which shall have a high tension longitudinally, as an important factor in my process and apparatus is providing a thin tight web capable of stretching in order that it may be wrapped and drawn tightly while wrapping around the axis of the bale. That part of the sheet indicated by $z$, extending from the contact lines at 1, of the rolls H and H', to the bale, and thence around it to the tangent line at 2 of the roll E, and the bale is under tension corresponding to the above described difference in speed of the roll E and the rolls H and H', this difference in speed resulting in the stretching of about an inch and a half to each foot of the sheet between the points 1 and 2.

At the commencement of a bale-forming operation the forward end edge of the sheet (reduced by repeated compressions in the rolls G, G' and H, H' from a thickness of three inches or thereabout to a thickness of one-eighth or three-sixteenths of an inch) is wrapped around the core, the earlier convolutions being pressed tightly by the rolls against it, the core commencing to move bodily slowly outward. As the core is resisted both in its bodily movement outward (by the retarding cable and hydraulic apparatus) and also in its rotation around its longitudinal axis, the sheet is tightly wrapped around it. The roll E is the only one which is positively driven and its rotary motion, while in contact with the external convolution of the cotton, serves to exert a stretching action around almost the entire periphery, the tension extending, as above described, back to the point 1 where the cotton leaves the rolls H, H'.

It will be seen that the core in my mechanism and its supporting and retarding or resisting devices are the only means which I employ for imparting to the bale a tendency to move in the direction of the axial plane common to the axes of the rollers E and F, the region around the periphery of the bale being free of all bale-contacting devices, such as rollers, belts, chains, or the like. And consequently the stretching action exerted by the roller E is unimpeded around the entire peripheral surface.

The impeding or retarding devices for the core act to produce such a condition or relation of the parts and of their movements that the convolutions, at the axis of the bale, and the outer convolutions can be regarded as moving in the same tangential direction, but with different speeds, and, consequently, a constant wrapping tension is maintained which is not interfered with by inward acting pressure at any peripheral line, parallel to the axis, between the contact lines of the closely adjacent rolls E and F. The roll F is of the same diameter as the roll E, and revolves with the same speed so that there is no interference caused by the said roll F with the stretching produced by the roll E, either at points in advance of the contact lines of the roll F (which would occur if it traveled faster than roll E) or behind this contact line of the roll F, which would occur if it traveled at a slower speed than the roll E. Were it not for the possibility of the tearing transversely of the flat part of the sheet or web before it begins to wrap around the bale, the roll F could be dispensed with, assuming a slight modification in the position of the axis of the roll E.

The functions of the roll F, when present, are to be understood as, first furnishing a balancing abutment for the bale while it is experiencing the inward strain of the core-drawing devices, and, secondly, as a sheet holder and guide to assist in maintaining the fibers of the flatter part of the sheet in their compacted condition.

Heretofore all of the mechanisms known to me for the baling of cotton have been characterized either by having two or more positively driven compressing rolls exerting pressing forces inward toward some line or points in the interior of the bale or so situated around the bale as to mutually react upon each other in exerting this inward directed pressure; or, they have had two bale engaging and pressing rolls diametrically opposite to each other across the bale, of which rolls one was positively power driven, and the other was bodily movable away from the power roll against the resistance of a retarding agency acting to insure a powerful pressure from the movable roll inward, through the bale, toward the other roll; or they have had two approximately diametrically opposite bale-engaging and pressing rolls, both positively driven by power, with one movable against a resisting agency; or they have had two pairs of bale engaging and pressing rolls, those of one pair being situated approximately at one end of a diameter through the bale, while those of the other pair were disposed approximately at the other end of the same diameter, and all positively driven by power, the rolls of one pair being yieldingly movable against a resistance, though in some instances a single large roll has been used in place of one of the pairs.

It will be seen on inspection of the drawings that I dispense entirely with reactionary pressure from a roll diametrically opposite to the bale driving roll, or pressure from two or more rolls disposed around a periphery at 90° and 120° apart. So far as concerns the application of inward exerted pressure on the periphery of the bale in the pressing machine, it is reduced to the smallest amount possible with a practical mechanism. The rolls E and F can be regarded as practically one abutment for the peripheral part of the bale, for after it has commenced to have any appreciable size it lies almost entirely outside of their common tangent plane. The action in my mechanism is not characterized by an inwardly directed condensing pressure at one line, balanced by reactionary pressures at other peripheral lines, but is characterized by this, namely, that the parts are so constructed and related that the cotton is merely wrapped under tension around a periphery.

What I claim is:

1. The herein described method of forming a bale of cotton, or analogous material, it consisting in first forming a condensed, thin, compact, sheet of fiber, coiling the said sheet into a substantially cylindrical bale by forming a series of successive convolutions, imparting rotary movements to the inner convolutions, and to the outer convolutions as the latter are successively formed, the angular velocity of the outer convolutions being relatively greater than that of the inner convolutions, substantially as set forth.

2. The herein described method of forming a bale of cotton, or analogous material, it consisting in first forming a condensed, thin, compact, sheet of fiber, coiling the said sheet into a substantially cylindrical bale by forming a series of successive convolutions, rotating the bale by the application of rotary forces to the external covolutions successively and retarding the rotation of the inner convolutions, substantially as set forth.

3. The herein described method of forming a bale of cotton, or analogous material, it consisting in first forming a condensed, thin, compact, sheet of fiber, coiling the said sheet into a substantially cylindrical bale by forming a series of successive convolutions, rotating the bale by the application of rotary force at or near one line only on the periphery parallel to the axis, and drawing the bale radially in the direction approximately of the said line of force-application, substantially as set forth.

4. The herein described method of forming a bale of cotton, or analogous material, it consisting in first forming a condensed, thin, compact, sheet of fiber, coiling the said sheet into a substantially cylindrical bale, delivering the sheet to the exterior of the bale at a line tangent to the periphery, rotating the bale by the application of rotary force to the external convolutions successively at a line closely adjacent to the aforesaid tangent line, substantially as set forth.

5. The herein described method of forming a bale of cotton, or analogous material, it consisting in first forming a condensed, thin, compact, sheet of fiber, coiling the said sheet into a substantially cylindrical bale by forming a series of successive convolutions, rotating the bale by the application of rotation causing force at one line only along the periphery of the bale, and permitting the axis of the bale to recede under retardation from the said line of force-application, substantially as set forth.

6. The herein described method of forming a bale of cotton, or analogous material, it consisting in first forming a condensed, thin, compact, sheet or fiber, coiling the said sheet into a substantially cylindrical bale by forming a series of successive convolutions, delivering the sheet to the periphery at a tangent line defined by a bale-abutting device, applying a rotation-causing force to the bale at a line closely adjacent to the said tangent line, and permitting the unrestrained longitudinal tension of the convolutions extending from the said line of force-application to the said abutting-device, substantially as set forth.

7. The herein described method of forming a bale of cotton, or analogous material, it consisting in first forming a condensed, thin, compact, sheet of fiber, coiling the said sheet into a substantially cylindrical bale by forming a series of successive convolutions, delivering the sheet to the periphery at a tangent line defined by a bale-abutting device, applying a rotation-causing force to the bale at a line closely adjacent to the said tangent line, and permitting an unrestrained longitudinal tension of the convolutions extending from the said line of force-application to the said abutting device allowing the primary or central convolutions to move away from the said abutting device and said line of force-application, substantially as set forth.

In testimony whereof I affix my signature, in presence of two witnesses.

JOHN A. TAFT.

Witnesses:
N. E. COSTELLO,
N. CURTIS LAMMOND.

Copies of this patent may be obtained for five cents each, by addressing the "Commissioner of Patents, Washington, D. C."